Figure 1:
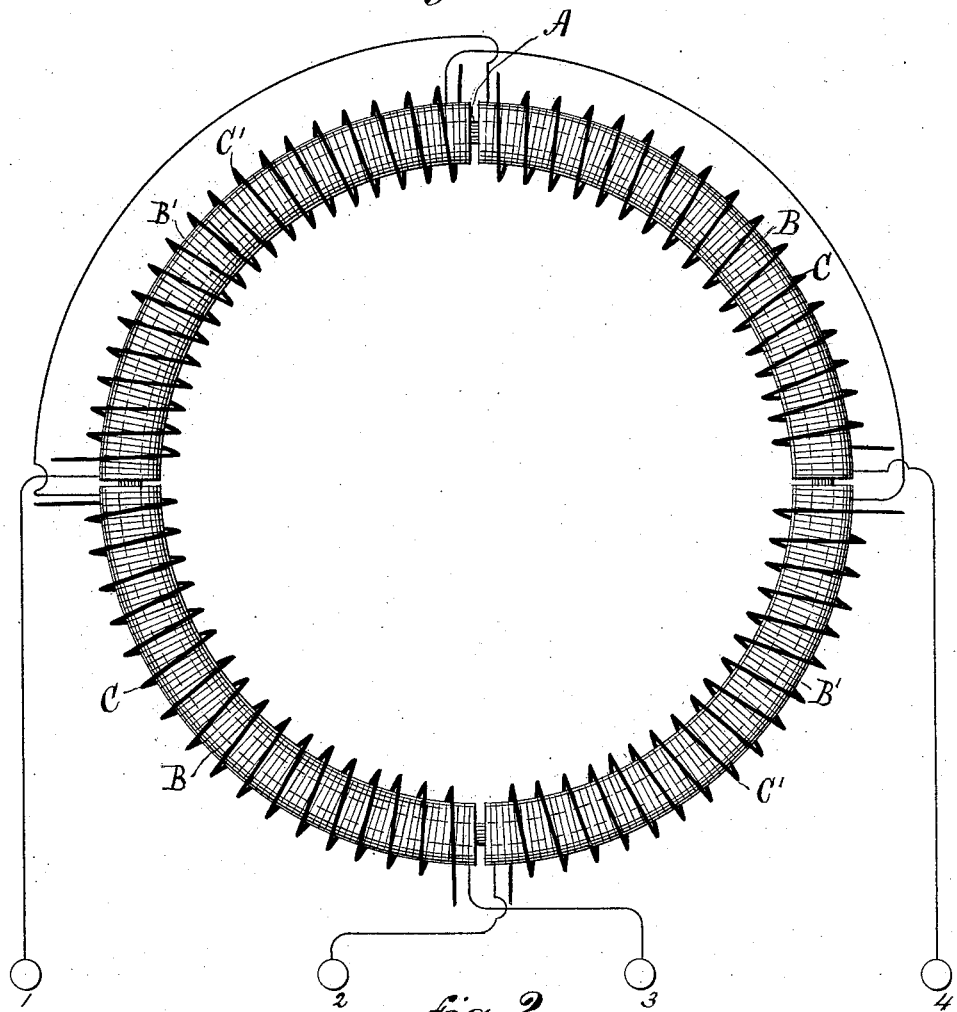

(No Model.) 2 Sheets—Sheet 1.

N. TESLA.
SYSTEM OF ELECTRICAL DISTRIBUTION.

No. 381,970. Patented May 1, 1888.

WITNESSES:
Robt. N. Duncan
Robt. F. Gaylord

INVENTOR.
Nikola Tesla.
BY
Duncan, Curtis & Page
His ATTORNEYS.

(No Model.) 2 Sheets—Sheet 2.

N. TESLA.
SYSTEM OF ELECTRICAL DISTRIBUTION.

No. 381,970. Patented May 1, 1888.

WITNESSES:
Robt. H. Duncan.
Robt. F. Gaylord.

INVENTOR.
Nikola Tesla.
BY
Duncan, Curtis & Page
his ATTORNEYS.

UNITED STATES PATENT OFFICE.

NIKOLA TESLA, OF NEW YORK, N. Y., ASSIGNOR OF ONE-HALF TO CHARLES F. PECK, OF ENGLEWOOD, NEW JERSEY.

SYSTEM OF ELECTRICAL DISTRIBUTION.

SPECIFICATION forming part of Letters Patent No. 381,970, dated May 1, 1888.

Application filed December 23, 1887. Serial No. 258,787. (No model.)

*To all whom it may concern:*

Be it known that I, NIKOLA TESLA, from Smiljan Lika, border country of Austria-Hungary, now residing at New York, in the county of and State of New York, have invented certain new and useful Improvements in Systems of Electrical Distribution, of which the following is a specification, reference being had to the drawings accompanying and forming a part of the same.

This invention relates to those systems of electrical distribution in which a current from a single source of supply in a main or transmitting circuit is caused to induce by means of suitable induction apparatus a current or currents in an independent working circuit or circuits.

The main objects of the invention are the same as have been heretofore obtained by the use of these systems—viz., to divide the current from a single source, whereby a number of lamps, motors, or other translating devices may be independently controlled and operated by the same source of current, and in some cases to reduce a current of high potential in the main circuit to one of greater quantity and lower potential in the independent consumption or working circuit or circuits.

The general character of the devices employed in these systems is now well understood. An alternating-current magneto-machine is used as the source of supply. The current developed thereby is conducted through a transmission-circuit to one or more distant points at which the transformers are located. These consist of induction-machines of various kinds. In some cases ordinary forms of induction-coil have been used with one coil in the transmitting-circuit and the other in a local or consumption circuit, the coils being differently proportioned according to the work to be done in the consumption-circuit—that is to say, if the work requires a current of higher potential than that in the transmission circuit the secondary or induced coil is of greater length and resistance than the primary, while, on the other hand, if a quantity current of lower potential is wanted the longer coil is made the primary. In lieu of these devices various forms of electro-dynamic induction-machines, including the combined motors and generators, have been devised. For instance, a motor is constructed in accordance with well-understood principles, and on the same armature are wound induced coils which constitute a generator. The motor-coils are generally of fine wire and the generator-coils of coarser wire, so as to produce a current of greater quantity and lower potential than the line-current, which is of relatively high potential, to avoid loss in long transmission. A similar arrangement is to wind coils corresponding to those described in a ring or similar core, and by means of a commutator of suitable kind to direct the current through the inducing-coils successively, so as to maintain a movement of the poles of the core and of the lines of force which set up the currents in the induced coils.

Without enumerating the objections to these systems in detail, it will suffice to say that the theory or the principle of the action or operation of these devices has apparently been so little understood that their proper construction and use have up to the present time been attended with various difficulties and great expense. The transformers are very liable to be injured and burned out, and the means resorted to for curing this and other defects have almost invariably been at the expense of efficiency.

The form of converter or transformer which I have devised appears to be largely free from the defects and objections to which I have alluded. While I do not herein advance any theory as to its mode of operation, I would state that, in so far as the principal of construction is concerned, it is analogous to those transformers which I have above described as electro-dynamic induction-machines, except that it involves no moving parts whatever, and is hence not liable to wear or other derangement, and requires no more attention than the other and more common induction-machines.

In carrying out my invention I provide a series of inducing-coils and corresponding induced coils, which, by preference, I wind upon a core closed upon itself—such as an annulus or ring subdivided in the usual manner. The two sets of coils are wound side by side or superposed or otherwise placed in well-known ways to bring them into the most effective relations to one another and to the core. The inducing or primary coils wound on the core are divided into pairs or sets by the proper electrical connections, so that while the coils of one pair or set to co-operate in fixing the magnetic poles of the core at two given diametrically-opposite points, the coils of the other pair or set—assuming, for sake of illustration, that there are but two—tend to fix the poles ninety degrees from such points. With this induction device I use an alternating-current generator with coils or sets of coils to correspond with those of the converter, and by means of suitable conductors I connect up in independent circuits the corresponding coils of the generator and converter. It results from this that the different electrical phases in the generator are attended by corresponding magnetic changes in the converter; or, in other words, that as the generator-coils revolve the points of greatest magnetic intensity in the converter will be progressively shifted or whirled around. This principle I have applied under variously-modified conditions to the operation of electro-magnetic motors, and in previous applications, notably in those having Serial Nos. 252,132 and 256,561, I have described in detail the manner of constructing and using such motors. In the present application my object is to describe the best and most convenient manner of which I am at present aware of carrying out the invention as applied to a system of electrical distribution; but one skilled in the art will readily understand from the description by the modifications proposed in said applications, wherein the form of both the generator and converter in the present case may be modified.

In illustration therefore of the details of construction which my present invention involves, I now refer to the accompanying drawings.

Figure 2:
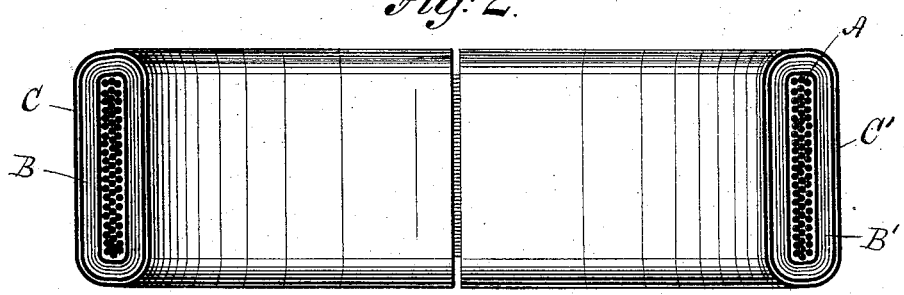
Figure 3:
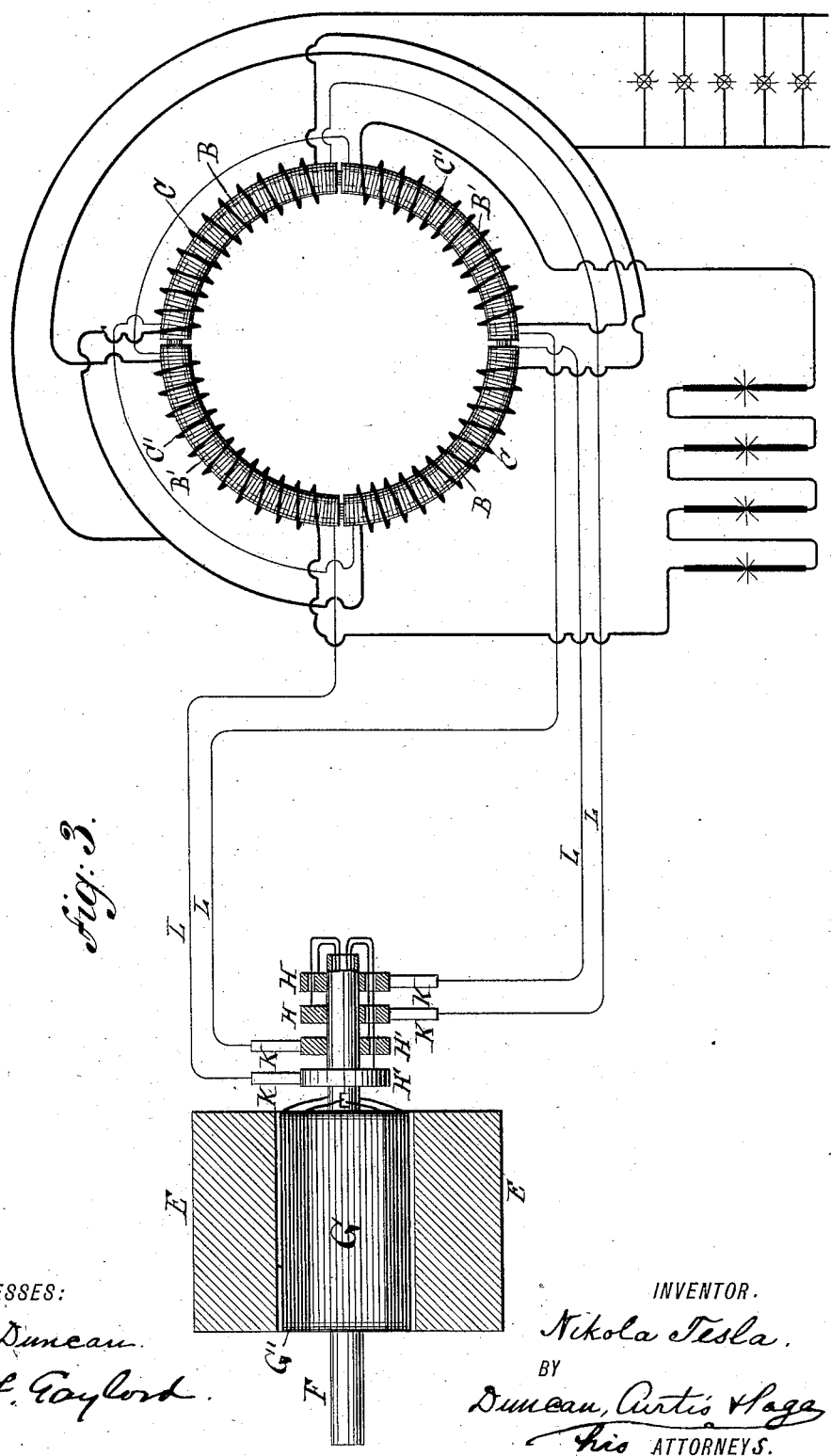

Figure 1 is a diagrammatic illustration of the converter and the electrical connections of the same. Fig. 2 is a horizontal central cross-section of Fig. 1. Fig. 3 is a diagram of the circuits of the entire system, the generator being shown in section.

I use a core, A, which is closed upon itself—that is to say, of an annular cylindrical or equivalent form—and as the efficiency of the apparatus is largely increased by the subdivision of this core I make it of thin strips, plates, or wires of soft iron electrically insulated as far as practicable. Upon this core, by any well-known method, I wind, say, four coils, B B B' B', which I use as primary coils, and for which I use long lengths of comparatively fine wire. Over these coils I then wind shorter coils of coarser wire, C C C' C', to constitute the induced or secondary coils. The construction of this or any equivalent form of converter may be carried further, as above pointed out, by inclosing these coils with iron—as, for example, by winding over the coils a layer or layers of insulated iron wire.

The device is provided with suitable binding-posts, to which the ends of the coils are led. The diametrically-opposite coils B B and B' B' are connected, respectively, in series, and the four terminals are connected to the binding-posts 1 2 3 4. The induced coils are connected together in any desired manner. For example, as shown in Fig. 3, C C may be connected in multiple arc when a quantity current is desired—as for running a group of incandescent lamps, D—while C' C' may be independently connected in series in a circuit including arc lamps or the like. The generator in this system will be adapted to the converter in the manner illustrated. For example, in the present case I employ a pair of ordinary permanent or electro magnets, E E, between which is mounted a cylindrical armature on a shaft, F, and wound with two coils, G G'. The terminals of these coils are connected, respectively, to four insulated contact or collecting rings, H H H' H', and the four line circuit-wires L connect the brushes K, bearing on these rings, to the converter in the order shown. Noting the results of this combination, it will be observed that at a given point of time the coil G is in its neutral position and is generating little or no current, while the other coil, G', is in a position where it exerts its maximum effect. Assuming coil G to be connected in circuit with coils B B of the converter, and coil G' with coils B' B', it is evident that the poles of the ring A will be determined by coils B' B' alone; but as the armature of the generator revolves, coil G develops more current and coil G' less, until G reaches its maximum and G' its neutral position. The obvious result will be to shift the poles of the ring A through one-quarter of its periphery. The movement of the coils through the next quarter of a turn, during which coil G' enters a field of opposite polarity and generates a current of opposite direction and increasing strength, while coil G, in passing from its maximum to its neutral position generates a current of decreasing strength and same direction as before, causes a further shifting of the poles through the second quarter of the ring. The second half-revolution will obviously be a repetition of the same action. By the shifting of the poles of the ring A a powerful dynamic inductive effect on the coils C C' is produced. Besides the currents generated in the secondary coils by dynamo-magnetic induction other currents will be set up in the same coils in consequence of any variations in the intensity of the poles in the ring A. This should be avoided by maintaining the intensity of the poles constant, to accomplish which care should be taken in designing and proportioning the generator and in distributing the coils in the ring A and balancing their effect. When this is done, the currents are produced by dynamo-magnetic induction only, the same result being obtained as though the poles were shifted by a commutator with an infinite number of segments.

The modifications which are applicable to other forms of converter are in many respects applicable to this. I refer more particularly to the form of the core, the relative lengths and resistances of the primary and secondary coils, and the arrangements for running or operating the same.

The new method of electrical conversion which this system involves I have made the subject of another application, and I do not claim it therefore herein.

Without limiting myself therefore to any specific form, what I claim is—

1. The combination, with a core closed upon itself, inducing or primary coils wound thereon and connected up in independent pairs or sets, and induced or secondary coils wound upon or near the primary coils, of a generator of alternating currents and independent connections to the primary coils, whereby by the operation of the generator a progressive shifting of the poles of the core is effected, as set forth.

2. The combination, with an annular or similar magnetic core and primary and secondary coils wound thereon, of an alternating-current generator having induced or armature coils corresponding to the primary coils, and independent circuits connecting the primary coils with the corresponding coils of the generator, as herein set forth.

3. The combination, with independent electric transmission-circuits, of transformers consisting of annular or similar cores wound with primary and secondary coils, the opposite primary coils of each transformer being connected to one of the transmission-circuits, an alternating-current generator with independent induced or armature coils connected with the transmission-circuits, whereby alternating currents may be directed through the primary coils of the transformers in the order and manner herein described.

NIKOLA TESLA.

Witnesses:
  ROBT. H. DUNCAN,
  ROBT. F. GAYLORD.